INVENTOR
THEODOR K. KEHLER
BY
ATTORNEYS

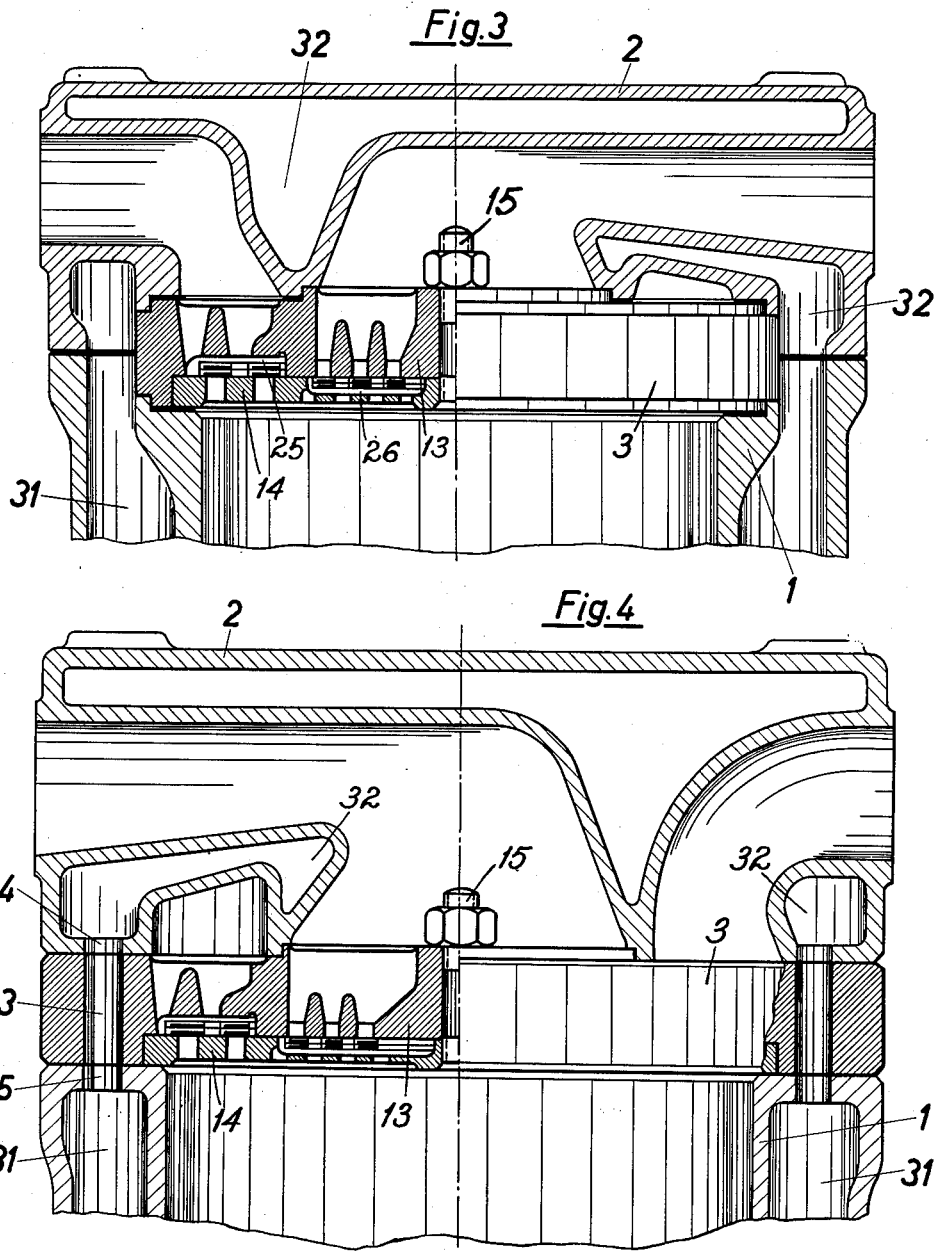

United States Patent Office 3,124,154
Patented Mar. 10, 1964

3,124,154
CONCENTRIC VALVE COMBINATION
Theodor Karl Kehler, Vienna, Austria, assignor to
Hoerbiger Ventilwerke A.G., Vienna, Austria
Filed Feb. 13, 1961, Ser. No. 88,924
Claims priority, application Austria Feb. 12, 1960
4 Claims. (Cl. 137—338)

The invention relates to a concentric valve combination, which is particularly suitable for high-speed, high-duty piston compressors and comprises an annular inlet valve and an annular discharge valve concentric therewith.

In combined concentric inlet and discharge valves the inlet and discharge chambers, the cylinder and any coolant ducts must be sealed against each other and against the environment. In the known designs these objects and a small and constant clearance space cannot be reliably achieved with simple means.

There are, e.g., air- or liquid-cooled valves in which the interface between the top and bottom plates extends to the extreme outer periphery and the bottom plate forms a carrying element so that it must be relatively thick, whereby the clearance space is enlarged.

In another known valve assembly for compressors for gases and vapors, the valves are incorporated in a complicated valve housing defining a coolant-filled cavity, which encloses on all sides the annular gap lying before the discharge valve, the discharge valve seat and the discharge valve guard.

Other valves are known which comprise a coolant jacket enclosing the bottom and top plates and in one form have no parting joint at the outer periphery of the valve body whereas the diameter of the carrying bottom plate is larger than that of the top plate and the latter is inserted in a recess of the bottom plate. With this design too the clearance space cannot be further reduced because the lower plate cannot be weakened to the extent which would be required.

A combined water-cooled inlet and discharge valve is known which has a body consisting of two plates of equal size, which are inserted between the cylinder and the cylinder head. In addition to a large clearance space of this valve, the cooling water passage openings of this valve have joints at the contact surface of the two halves of the valve housing and it is difficult to seal these joints so that cooling water is liable to trickle through them.

It is an object of the invention to avoid the disadvantages which occur with the known valves.

It is a feature of the invention that the valve comprises annular inlet and discharge valves disposed in a common valve body, which valve body consists of at least one top part and one bottom part and containing the necessary valve members and spring members, the diameter of said bottom part being smaller than that of the top part, the interface between said top and bottom parts lying within the outer periphery of the valve body.

It is another feature of the invention that the interface between the top and bottom parts of the valve body lies exclusively within that area of the valve body which is surrounded by the coolant passages.

It is a further feature of the invention that the outer edge of the lower boundary face of the top part and the lower boundary face of the bottom part lie in a common plane.

The special advantages of such an arrangement reside in that the sealing of the valve body mainly against trickling of coolants is much facilitated. This is not only due to the reduction of the interfaces to be sealed but also to the fact that the top and bottom parts have a common interface, which can be mutually lapped during assembly or may be sealed by a gasket.

It is also a feature of the invention that, in order to reduce the clearance space, the bottom part of the valve body is much lower than the top part, which mainly carries the load.

This feature results in an appreciable increase in the volumetric efficiency.

Several illustrative embodiments of the valve combination according to the invention are shown in the drawing.

FIG. 1 shows the arrangement of a valve combination according to the invention in an air-cooled compressor; the left-hand half is entirely a longitudinal sectional view and the right-hand half is also a longitudinal sectional view with the exception of the valve body, which is shown in elevation.

The further figures show examples of water-cooled machines.

FIG. 3 is an axial sectional view showing the top part of a cylinder. The valve body is shown in a sectional view in the left-hand half and in elevation in the right-hand half.

FIG. 4 is an axial longitudinal sectional view showing another modification of the top part of the cylinder. The valve body is shown entirely in section in the right-hand half and partly in section in the left-hand half.

Figure 1:
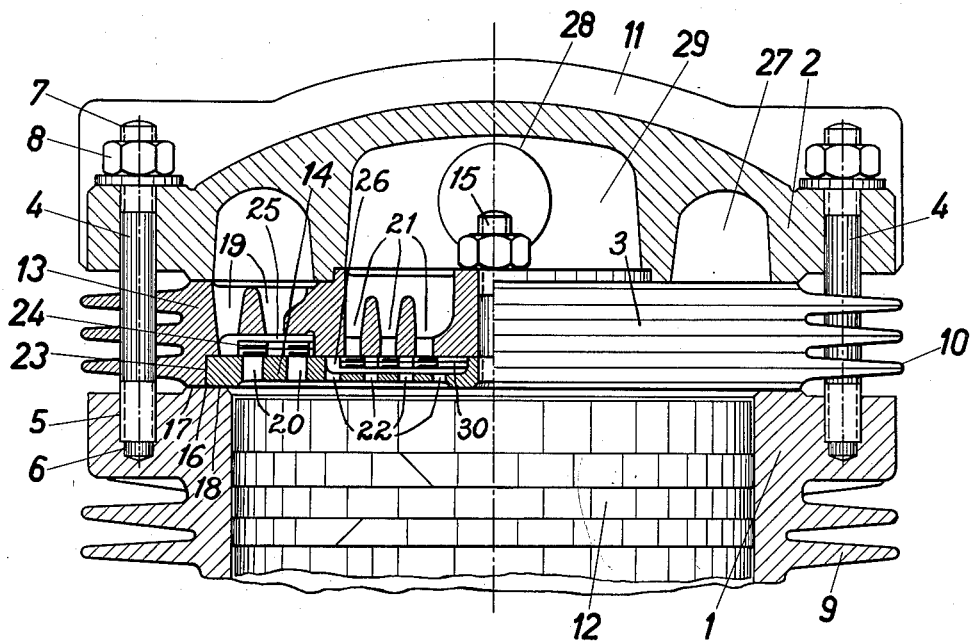

In all showings, 1 is the top part of the cylinder, 2 the cylinder head and 3 the valve body clamped between the cylinder and cylinder head. These parts are connected by cylinder head screws 4 having threaded lower portions 5 screwed in a tapped hole 6 of the cylinder 1 and top end portions which extend through the cylinder head 2 and at their end protruding from the cylinder head carry screw threads 7, on which a nut 8 is screwed, which clamps the parts to be connected.

In the embodiment shown in FIG. 1 the cylinder 1, cylinder head 2 and valve body 3 are provided with outwardly protruding cooling fins 9, 10, 11 are swept by the air.

Only the top end of the working piston 12 is shown, at its top dead center.

The valve body 3 consists of a top part 13, or disc, and a bottom part 14, or disc, which is concentrically inserted in a recess 23 in the top part and connected to the top part by a screw 15 extending along the center line of the two parts. As is apparent from the drawing, the diameter of the bottom part is smaller than that of the top part and substantially equal to the medial diameter of the cylinder wall, and the interface between the top and bottom parts lies within the outer periphery of the valve body on the center of the upper edge of the cylinder wall. Compared to the bottom part 14, the top part 13 of the valve body 3 is the part which carries the main part of the load and has a much greater height than the bottom part. The boundary faces of the two parts of the valve body are planar and designed so that the outer rim 16 of the lower boundary surface 17 of the top part 13 and the lower boundary surface 18 of the bottom part lie in one plane. The clearance space is reduced because the bottom part 14 is much thinner than the top part 13 and is seated entirely within the confines of the top part saving the thickness of the bottom disc.

The top part 13 and the bottom part 14 are formed with ports 19 and 20 for the discharge of the compressed fluid and with ports 21 and 22 slightly spaced from the axis and serving for the intake of the fluid to be compressed.

The bottom surface of the recess 23 of the top part 13, which recess receives the bottom part 14, is formed adjacent to the ports 19 with a wide annular groove 25 for accommodating the valve members and spring members 24 on the discharge side, which members are only indicated in the drawing. Adjacent to the ports 22 the bottom part 14 is formed in its top face facing the top part with an annular groove 26, which accommodates the valve members and spring members 30 on the intake side.

The cylinder head 2 is formed with a substantially annular groove 27 leading to the fluid discharge conduit and a recess 29 connected to the intake conduit 28. The ports 19 of the top part 13 open into the groove 27 and the ports 21 of the top part 13 open into the recess 29.

In the position of rest shown in the drawing the ports 20 and 21 are covered by the associated valve members. The downward movement of the piston causes the valve members to be lifted from the ports 21 by the suction created in the piston space, and the fluid to be compressed is induced through said ports and the passages 22 connected thereto. The upward movement of the piston 12 causes the ports 21 to be closed and the pressure of the compressed fluid causes the valves 24 to be lifted from their seats so that the compressed fluid can be expelled into the discharge conduit.

Figure 2:
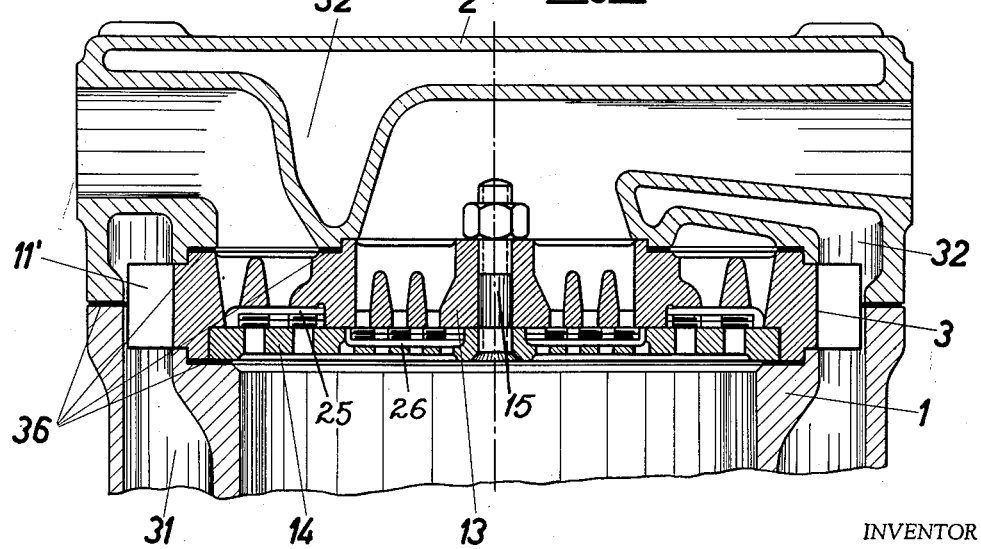
FIG. 2 is an axial sectional view showing the top part of a cylinder, in which the valve body is inserted in a recess between the cylinder and cylinder head and has cooling fins disposed at its periphery and extending into coolant passages.

In the embodiment shown in FIG. 2, the valve body is similar in design to that of FIG. 1. The difference resides in that the air-cooled fins 10 are replaced by water-cooled fins 11', which protrude into passages 31 and 32 formed in the cylinder 1 and cylinder head 2, respectively, and through which cooling water flows. The passages 31 fulfill also the function of the fins 9 of the preceding embodiment. The passage 32 extends also through the wall of the head 2 on the cover side and has the same function as the fins 11. The interface between the top part 13 and the bottom part 14 of the valve body 3 lies only in that area of the valve body which is surrounded by the coolant passages. The mode of operation is the same as that of the valve of FIG. 1.

The valve shown in FIG. 3 has the same mode of operation and substantially the same design as the valve of FIG. 2. The single difference resides in that there are no fins 11' extending into the liquid coolant and the periphery only of the upper valve part is engaged by cooling water.

In the valve shown in FIG. 4, the valve body 3 extends substantially to the rim of the cylinder 1 and the cylinder head 2. The cooling water flows through jointless passages 33 spaced from the outer rim of the valve body and communicating with the passage 32 through openings 34 formed in the wall of the cylinder head 2 and with the passage 31 through openings 35 formed in the top wall of the cylinder 1. In other respects the valve is equal to that of FIG. 3 in design and mode of operation.

All embodiments of the valve according to the invention comprise gaskets to prevent an escape of the pressure fluid and in the liquid-cooled embodiments also the escape of the cooling liquid. Some of these gaskets are designated at 36 in FIG. 2.

What is claimed is:
1. A valve assembly, particularly for piston type compressors and adapted to be clamped between a cylinder and cylinder head, comprising a common valve body formed of upper and lower discs concentrically arranged for gripping one over the other between a cylinder and cylinder head of a compressor, annular flow passages in said discs, a suction valve and an exhaust valve concentric with respect to each other in said passages, and spring means bearing against the said valves to close the flow passages, said upper disc having an outer rim extending the complete height of the valve assembly for gripping between a cylinder head and a cylinder, a concentric recess in the under surface of said upper disc for receiving the lower disc, said lower disc being much thinner than said upper disc and being nested in said concentric recess for gripping between the upper disc and a cylinder, the rims of said upper and lower disc being juxtaposed at the wall of said recess, and the lower faces of said rims being coplanar for resting tightly on the upper edge of the wall of a cylinder, whereby the valve assembly may more readily be sealed between a cylinder and its head.

2. In a piston type compressor having a cylinder and a cylinder head, a valve assembly clamped between said cylinder and cylinder head comprising a common valve body formed of upper and lower discs concentrically arranged and gripped one over the other between said cylinder and cylinder head, annular flow passages in said discs, a suction valve and an exhaust valve concentric with respect to each other in said passages, and spring means bearing against the said valves to close the flow passages, said upper disc having an outer rim extending the complete height of the valve assembly and gripped between said cylinder head and cylinder, a concentric recess in the lower surface of said upper disc facing the said cylinder, said lower disc being much thinner than said upper disc and being nested in said concentric recess and gripped between said upper disc and the said cylinder, the rims of said upper and lower discs being juxtaposed at the wall of said recess, and the lower faces of said rims being coplanar and resting on the upper edge of the wall of said cylinder, whereby the valve assembly may more readily be sealed between the cylinder and its head.

3. The combination of a compressor having a cylinder, cylinder head and valve assembly as set forth in claim 2 wherein, said concentric recess in the lower surface of the upper disc is substantially equal to the medial diameter of the cylinder wall.

4. The combination as set forth in claim 2, further comprising a cooling device for the compressor and cooling passages for a cooling fluid in the combined valve assembly, said cooling passages extending entirely in said top disc of the valve assembly and being disposed outside the periphery of said bottom disc.

References Cited in the file of this patent

UNITED STATES PATENTS

| 2,981,462 | Niedermayer | Apr. 25, 1961 |

FOREIGN PATENTS

| 472,697 | Great Britain | Sept. 29, 1937 |
| 109,563 | Australia | Jan. 25, 1940 |
| 921,606 | Germany | Dec. 23, 1954 |
| 1,039,693 | Germany | Sept. 25, 1958 |
| 517,301 | Canada | Oct. 11, 1955 |